3,120,540
BIS(POLYMETHYL)-4-PIPERIDINOL ALKANOATES

Robert I. Meltzer, Rockaway, and Wilson B. Lutz, Florham Park, N.J., assignors to Warner-Lambert Pharmaceutical Company, Morris Plains, N.J., a corporation of Delaware
No Drawing. Filed Sept. 25, 1961, Ser. No. 140,210
2 Claims. (Cl. 260—294.3)

The present invention relates to new and novel piperidine derivatives of the formula

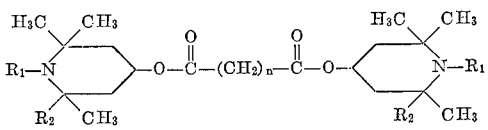

wherein $R_1$ is hydrogen or lower alkyl, $R_2$ is hydrogen or methyl and $n$ is 1 to 4 and to the pharmaceutically acceptable non-toxic acid addition and quaternary ammonium salts thereof.

The compounds of our invention having the above formula have been found to possess significant pharmacological activity in lowering blood pressure. Moreover, they are valuable intermediates in the production of other piperidine derivatives.

We have now found that the above compounds may be prepared by the reaction of a substituted 4-piperidinol starting material of the formula

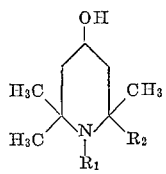

wherein $R_1$ and $R_2$ are as described above with an acid anhydride having the formula

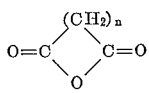

in the presence of an inert solvent such as benzene and an acid catalyst such as p-toluenesulfonic acid, sulfuric acid and the like. Useful acid anhydrides include the anhydrides of malonic, succinic, glutaric and adipic acids.

The substituted 4-piperidinol starting materials are well known compounds which may be prepared in accordance with known procedures.

The compounds of our invention may be readily converted by conventional procedures into their pharmaceutically acceptable non-toxic acid addition and quaternary ammonium salts. Useful acid addition salts are those of such acids as maleic, oxalic, citric, acetic, methylsulfonic, p-toluenesulfonic, sulfonic, sulfuric, phosphoric, cinnamic, hydrochloric, hydrobromic and the like. Useful quaternaries are formed with such reactive halides or esters as methyl iodide, n-hexyl bromide, benzyl chloride, methyl sulfate, ethyl sulfate, methyl p-toluenesulfonate and the like.

For therapeutic use, our new and novel compounds, either as the free base or in the form of a salt, may be formulated with a conventional pharmaceutical carrier to form tablets, capsules, elixirs, solutions, suspensions, suppositories and the like.

The following example is included in order further to illustrate our invention:

EXAMPLE

*Bis(1,2,2,6,6-Pentamethyl-4-Piperidyl)Succinate*

In a 250 ml. flask are placed 12.0 (70 mmoles) of 1,2, 2,6,6-pentamethyl-4-piperidinol, 3.5 g. (35 mmoles) of powdered succinic anhydride and 60 ml. of benzene. The mixture is maintained at reflux for one hour. The solids dissolve initially but are rapidly replaced by a new crystalline material, probably the half ester. The reaction mixture is cooled and a solution of 18.1 g. (105 mmoles) of p-toluenesulfonic acid in 60 ml. of benzene is added. Benzene-water azeotrope is slowly distilled through the column during a period of 21 hours. The light tan reaction mixture is cooled and stirred with a solution of 27 g. of potassium carbonate in 75 ml. of water. The mixture is transferred to a separatory funnel with the aid of 40 ml. of ether and 55 ml. of water. The lower layer is separated and extracted with 60 ml. of ether in three portions. The combined extract is filtered through a bed of potassium carbonate, then is further dried by distilling the benzene-ether through a column. Residual solvent is removed leaving a yellow oil which is diluted with 30 ml. of ether and treated with a solution of 2.7 ml. of conc. sulfuric acid in 15 ml. of cold 2-propanol. Ethyl acetate (25 ml.) is added and the supernate decanted from the gummy product. The gum is warmed with 25 ml. of 1-propanol. Crystalization follows rapidly. The decantate also deposits crystals on standing. The two products are collected on a Buchner funnel and washed successively with 2-propanol, ethyl acetate, and ether. The dry product weighs 8.20 g. The filtrate from this material treated with 1.5 ml. of conc. $H_2SO_4$ yields an additional 9.1 g. of material. The combined crops were recrystallized from methanol-2-propanol to give 16.6 g. (76.5%) of small crystals, M.P. 250–253° softening 249°. Recrystallization from methanol-ethanol and drying the product at 110° for 18 hours at 0.05 mm. over phosphorus pentoxide yields the bis(hydrogen sulfate) salt of bis(1,2,2,6,6-pentamethyl-4-piperidyl)succinate, melting point=252—256° with softening above 250° (bath preheated to 245°).

*Analysis.*—Calcd.: C, 46.43; H, 7.79; N, 4.51. Found: C, 46.46; H, 7.87; N, 4.63.

Treatment of the crude free base with oxalic acid in ethanol yields the bis-acid oxalate salt, melting point=231–232° after recrystallization from 1-propanol.

In the foregoing example, all temperatures are given in degrees centigrade.

It is understood that the foregoing detailed description is given merely by way of illustration and that many variations may be made therein without departing from the spirit of our invention.

Having described our invention, what we desire to secure by Letters Patent is:

1. A member selected from the group consisting of compounds of the formula

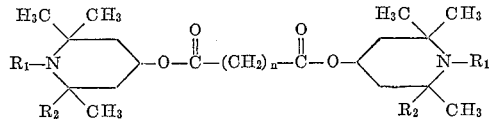

wherein $R_1$ is a member selected from the group consisting of hydrogen and lower alkyl, $R_2$ is a member selected from the group consisting of hydrogen and methyl and $n$ is 1 to 4 and the pharmaceutically acceptable non-toxic acid addition salts and quaternary ammonium salts thereof with a member selected from the group consisting of methyl iodide, n-hexyl bromide, benzyl chloride, methyl sulfate, ethyl sulfate and methyl p-toluene sulfonate.

2. Bis(1,2,2,6,6-pentamethyl-4-piperidyl)succinate.

No references cited.